(12) United States Patent
Kalinin et al.

(10) Patent No.: US 11,341,625 B2
(45) Date of Patent: May 24, 2022

(54) METHOD FOR REDUCING IMAGE ARTIFACTS

(71) Applicant: CARL ZEISS MICROSCOPY GMBH, Jena (DE)

(72) Inventors: Stanislav Kalinin, Weimar (DE); Volodymyr Kudryavtsev, Jena (DE); Thomas Egloff, Jena (DE); Wolfgang Bathe, Jena (DE); Benedikt Lübbers, Erfurt (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 33 days.

(21) Appl. No.: 16/818,618

(22) Filed: Mar. 13, 2020

(65) Prior Publication Data
US 2020/0294216 A1 Sep. 17, 2020

(30) Foreign Application Priority Data
Mar. 14, 2019 (DE) .......................... 102019203448.9

(51) Int. Cl.
*G06T 5/50* (2006.01)
*G06T 5/00* (2006.01)

(52) U.S. Cl.
CPC .............. *G06T 5/50* (2013.01); *G06T 5/001* (2013.01)

(58) Field of Classification Search
CPC ........... G06T 5/001; G06T 5/002; G06T 5/50; G06T 2207/10008
See application file for complete search history.

(56) References Cited

U.S. PATENT DOCUMENTS

| 9,269,144 | B2 * | 2/2016 | Kraus | A61B 3/0025 |
| 10,402,965 | B1 * | 9/2019 | Bagherinia | G06T 7/0081 |
| 2018/0256024 | A1 * | 9/2018 | An | G06T 7/254 |

OTHER PUBLICATIONS

PC Hansen, The L-Curve and its Use in the Numerical Treatment of Inverse Problems (2000), Computational Inverse Problems in Electrocardiology, ed. P. Johnston, Advances in Computational Bioengineering (Year: 2000).*

* cited by examiner

*Primary Examiner* — Emily C Terrell
*Assistant Examiner* — Molly Delaney
(74) *Attorney, Agent, or Firm* — Brake Hughes Bellermann LLP

(57) ABSTRACT

The invention relates to a method for reducing image artifacts in images of a sample captured by scanning, wherein intensity values of at least two detection regions, denoted as pixels ($Px_n$), are captured along respectively one row (j) in a first scanning direction. A reconstructed image is produced on the basis of the captured intensity values. According to the invention, the intensity values of the reconstructed image are summed along the rows (j) respectively scanned by a certain pixel ($Px_n$) and a row sum is formed in each case. A correction value of the pixel ($Px_n$) is ascertained on the basis of the row sums formed thus and the correction value is applied to the intensity values, captured by means of the pixel ($Px_n$), of the reconstructed image, as a result of which a corrected image is obtained.

12 Claims, 4 Drawing Sheets

METHOD FOR REDUCING IMAGE ARTIFACTS

CROSS REFERENCE TO RELATED APPLICATION

This application claims priority to, under 35 U.S.C. Section 119, and the benefit of, German Application 102019203448.9, filed Mar. 14, 2019, the disclosure of which is incorporated herein by reference in its entirety.

FIELD OF THE INVENTION

The invention relates to a method for reducing image artifacts according to the preamble of the independent claim.

BACKGROUND

Recording an image region-by-region or row-by-row by means of a plurality of detectors and combining the captured image data as error-free as possible to form a high-quality reconstructed image puts great technical demands both on the image recording technology employed and on the computational processing of the multiplicity of image data of the individual detectors.

For the purposes of a scanning capture of image data, an object to be imaged, for example, a sample, is periodically scanned with the same distance between the respective scan rows by means of punctiform, linear or elliptic laser illumination. Here, the individual detectors typically capture image data of regions of the sample to be imaged, said regions not overlapping one another or not overlapping one another completely. However, it is not uncommon for the reconstructed image to have visible artifacts which, inter alia, are a consequence of the image reconstruction from the multiplicity of individual image data.

The sample is usually scanned row-by-row. Should the scanning process be implemented simultaneously in at least two rows using at least two detectors that are disposed offset from one another, this is also referred to as a parallelized method. Here, the row spacing between rows that are captured by a certain detector is usually a multiple of the row spacing of a conventional single-point scanner, for example, of a confocal laser scanning microscope. In such a parallelized method, stripes between the rows in the row direction often arise in the reconstructed image.

If image data are captured in different focal planes and a so-called Z-stack is formed, then the stripe patterns in the various Z-planes may also differ from one another. Here, even rows captured by the same detector in each case may have a stripe formation.

The visibility of image artifacts, in particular, such stripes, can disadvantageously be amplified further by further steps of the image processing. By way of example, within the scope of a correction of the bandwidth-limited scanning process, this may occur as a result of a deconvolution using the scanning frequency response or as a result of the effect of sharpening filters.

SUMMARY

The invention is based on the object of proposing an option for reducing image artifacts.

The object is achieved by means of a method having the features of claim 1.

Advantageous developments are the subject matter of the dependent claims.

The method serves to reduce image artifacts in images of a sample captured by scanning. Here, intensity values of at least two detection regions (also referred to as pixels below), in particular, punctiform or elliptical detection regions, are captured along respectively one row in a first scanning direction. A reconstructed image is produced on the basis of the captured image data. Each pixel is assigned to respectively one detector, by means of which the image data are captured. For simplification purposes, the terms pixel and detector are used to mean the same below unless a distinction is expressly highlighted.

According to the invention, the method is characterized in that the intensity values (image data) of a reconstructed image are summed along the rows respectively scanned by this pixel and a row sum is formed in each case. By way of example, the reconstruction is implemented by a deconvolution of the captured image data using a point spread function (PSF) or a scanning frequency response in a known manner. Thus, a number of row sums is calculated for each pixel or for each detector.

These pixel-specific row sums form the basis for the ascertainment of a correction value of the respective pixel. The correction value is applied to the intensity values of the reconstructed image that were captured by means of the pixel. By way of example, the intensity values are multiplied by the correction value or its inverse. A corrected image is obtained as a result of the application of the correction value.

In a configuration of the method that is easy to implement, the correction value can be formed as a mean value of all row sums of the rows scanned by means of a specific pixel (parallelized rows). Advantageously, the mean value is normalized over the parallelized rows.

In a further configuration, an inverse of the correction value can be formed and the reconstructed image data of the rows scanned by means of the pixel can then be multiplied by said inverse as a correction factor.

In one configuration of the method according to the invention, intensity values of a respective further row are scanned following the capture of rows, wherein the capture is displaced by a number of rows (parallelization factor P) in each case when said capture is implemented in a direction substantially orthogonal to the first scanning direction.

By way of example, such displacement is carried out when using linked detectors. Thus, a number of detectors can be disposed in an array. The detectors, and hence associated pixels, therefore have a fixed positional relationship with respect to one another and with respect to the respectively captured rows. By way of example, Airy scan detectors are usually constructed in this way (e.g., Huff, J. et al. 2015; The Airy detector from ZEISS—Confocal imaging with improved signal-to-noise ratio and superresolution; Technology Note EN_41_013_102; Carl Zeiss Microscopy GmbH).

Scanning of the rows can be implemented in bidirectional fashion in sequences of a forward scan and a return scan in each case. Here, the respective deflection of a scanning optical unit following a scanning movement is advantageously used as an initial position for a further scanning movement. The time advantage must be seen alongside possibly different positions during the forward scan and return scan.

In a further possible configuration of the method, scanning is always only carried out in one direction, i.e., unidirectionally. The scanning errors are the same in one scanning direction and hence less visible.

The configurations described above are applicable to image data that were captured in one object plane (X/Y- plane). Here, the object plane extends substantially orthogonal to an optical axis of the detectors, which extends along a Z-axis (Z-direction). Different object planes can be scanned in the Z-direction and the image data thereof can be captured and stored in each case (Z-stack).

In order to be able to also subject such Z-stacks to a reduction of image artifacts according to the method according to the invention, in one configuration a maximum intensity projection (MIP) is applied to at least two corrected images that lie in succession in a Z-direction and an MIP image with an extent in the direction of the X- and Y-axis of a Cartesian coordinate system is produced. The steps of forming row sums and ascertaining the correction value are applied again to the MIP image obtained thus.

The correction value is applied to the individual corrected images of the Z-stack. The reduction of the image artifacts within the images of the individual Z-planes is therefore combined with a subsequent reduction of image artifacts of the Z-stack in this configuration. Here, each reconstructed image experiences a two-fold correction.

In further configurations of the method, maximum values, mean values and/or medians of other dimensions than the one along the Z-direction can be used as a basis for producing an MIP image. By way of example, an object plane can be successively captured at different times. The image data captured in each case in the process are used as underlying data of an MIP instead of the individual Z-planes of a Z-stack. Accordingly, an MIP image can be produced by virtue of image data of at least one object plane being captured by multiple detection channels, for example by channels with different detection wavelengths, and being used as a basis for carrying out an MIP.

It is also possible for image data of a sample to be captured at a plurality of locations (positions) and/or recording angles. An MIP can likewise be carried out on the basis of these image data and correction values can be ascertained on the basis of an MIP image obtained, reconstructed image data being able to be converted into corrected image data with the aid of said correction values.

Further, combinations of image data captured along different dimensions are possible. By way of example, a Z-stack can be combined with a time series (dimension time). Thus, a maximum can be ascertained and a correction value can be calculated over all Z-planes and at all or some times, respectively within the scope of an MIP. Said correction value is then applied to the corrected images of the selection, i.e., the relevant Z-planes and times.

Within the scope of reducing computational steps and the required computational capacity, the correction values can be ascertained and applied to a number of, or all, subsequently reconstructed images in further configurations. If a drift compensation of the correction values can be expected to be needed over time, the correction values can be ascertained anew after a predetermined time or after a predetermined number of uses.

Further, the value range of the correction values could be limited in the described configurations of the method. Such limiting is particularly advantageous when the intensity values are distributed over the image in very irregular fashion and, for example, only local regions (spots) of very high intensities are captured, which are surrounded by large areas of very low intensities. Limiting can be implemented by virtue of predetermining admissible maximum values and/or admissible minimum values. It is also possible for the correction values to be limited by a function for restricting the correction values. By way of example, the correction values are multiplied by such a function.

In further configurations, the correction values can also be restricted by the use of simulations. Thus, the admissible maximum values and/or the admissible minimum values, and also the restricting function, can be adapted on the basis of a simulation calculation (simulation). Such a procedure increases the flexibility of the method and allows dynamic adaptation of the limits.

Moreover, the method can be configured in such a way that a correction function is used to form derived correction values using the ascertained correction values. Here, the reconstructed image data are not corrected directly but by means of an adapted correction function. The parameters of a correction function are fitted to the ascertained correction values for a good correspondence with the correction values. Alternatively, the parameters of the correction function are calculated directly by means of recursion. Derived correction values are calculated and the correction is carried out by means of the ascertained parameters and the correction function.

The advantages of the invention lie, in particular, in a reduction of stripes in images recorded in scanning fashion. It is possible to reduce image artifacts that arise on account of different optical recording behavior (individual PSFs) among individual detectors and on account of deviating optical recording behaviors during the forward and return scans. Moreover, the method according to the invention offers the possibility of also effectively reducing image artifacts in Z-stacks. The method can be integrated in novel or already existing image recording apparatuses or image evaluation software with little technical outlay. Should atypical intensity distributions occur in the image data, the applicability of the method can be ensured by fixed or dynamic restrictions of the correction values. In addition or as an alternative thereto, derived correction values can be produced and applied, as a result of which the flexibility of the method can likewise be increased.

BRIEF DESCRIPTION OF THE DRAWINGS

The invention is explained in more detail below on the basis of exemplary embodiments and figures. In the figures.

DETAILED DESCRIPTION

Figure 1:
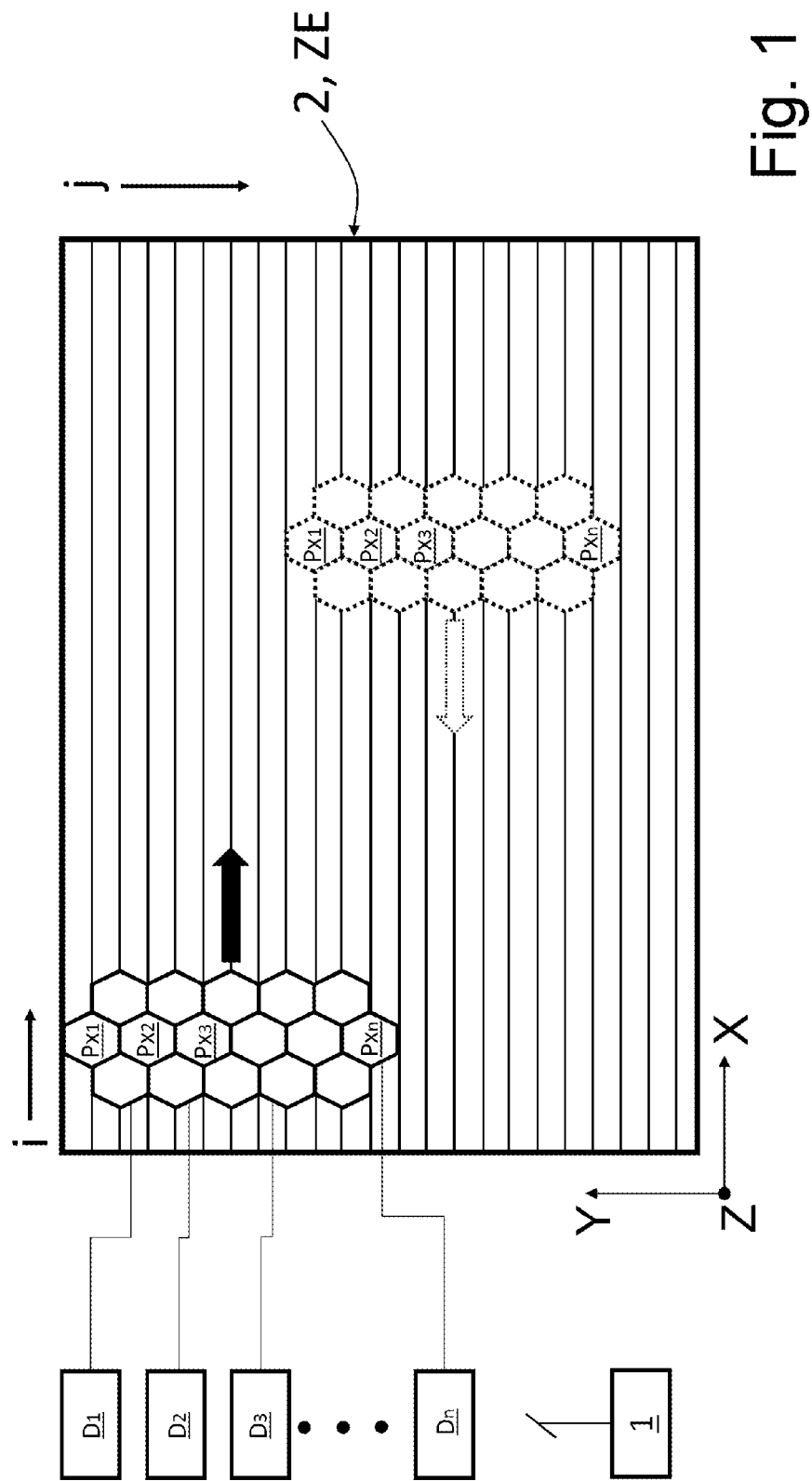
FIG. 1 shows a schematic representation of a bidirectional scanning scheme for an object plane.

FIG. 1 schematically shows a number of pixels Pxn (i=1, 2, 3, . . . , n), which adjoin one another and are assembled to form a compound structure. The image data of each pixel $Px_n$ is captured in each case by means of a detector D1, D2, D3, . . . , Dn (i=1, 2, 3, . . . , n) assigned to the relevant pixel Pxn. The detectors D1, D2, . . . , Dn are connected to an evaluation unit 1 in a manner suitable for the transfer of data. The evaluation unit 1 is configured to carry out the method according to the invention.

The image data are captured by virtue of the pixels Pxn being guided along rows j in an object plane 2. The rows j, in fact only present virtually, are plotted for explanation purposes. The object plane 2 is a currently captured Z-plane ZE at the same time, i.e., it is situated at a position Z along a z-axis Z and extends along an x-axis X and a y-axis Y of a Cartesian coordinate system. The pixels Pxn illustrated in the region of the top left corner of the object plane 2 in FIG. 1 are currently moved from left to right along the rows j (forward scan; symbolized by an arrow). Each capture position of the pixels Pxn along the rows j adopted in the process represents a column i of the object plane 2. Therefore, the captured image data are captured and stored in a manner assigned to rows j and columns i of an object plane 2 or a Z-plane ZE.

For the return scan, the pixels Pxn (illustrated using dashed lines) are displaced orthogonally to the direction of the rows j by a parallelization factor P. In the illustrated exemplary embodiment, P=8 rows j).

During the forward scan, the image data of each pixel Pxn are captured and stored row-by-row. Then, the pixels Pxn are offset according to the parallelization factor P for the return scan. Here, some rows j can be swept over both during the forward scan and during the return scan, albeit by different pixels Pxn. Reconstructed image data and a reconstructed image are calculated from the captured image data by applying reconstruction methods, for example by applying a deconvolution function.

Figure 2:
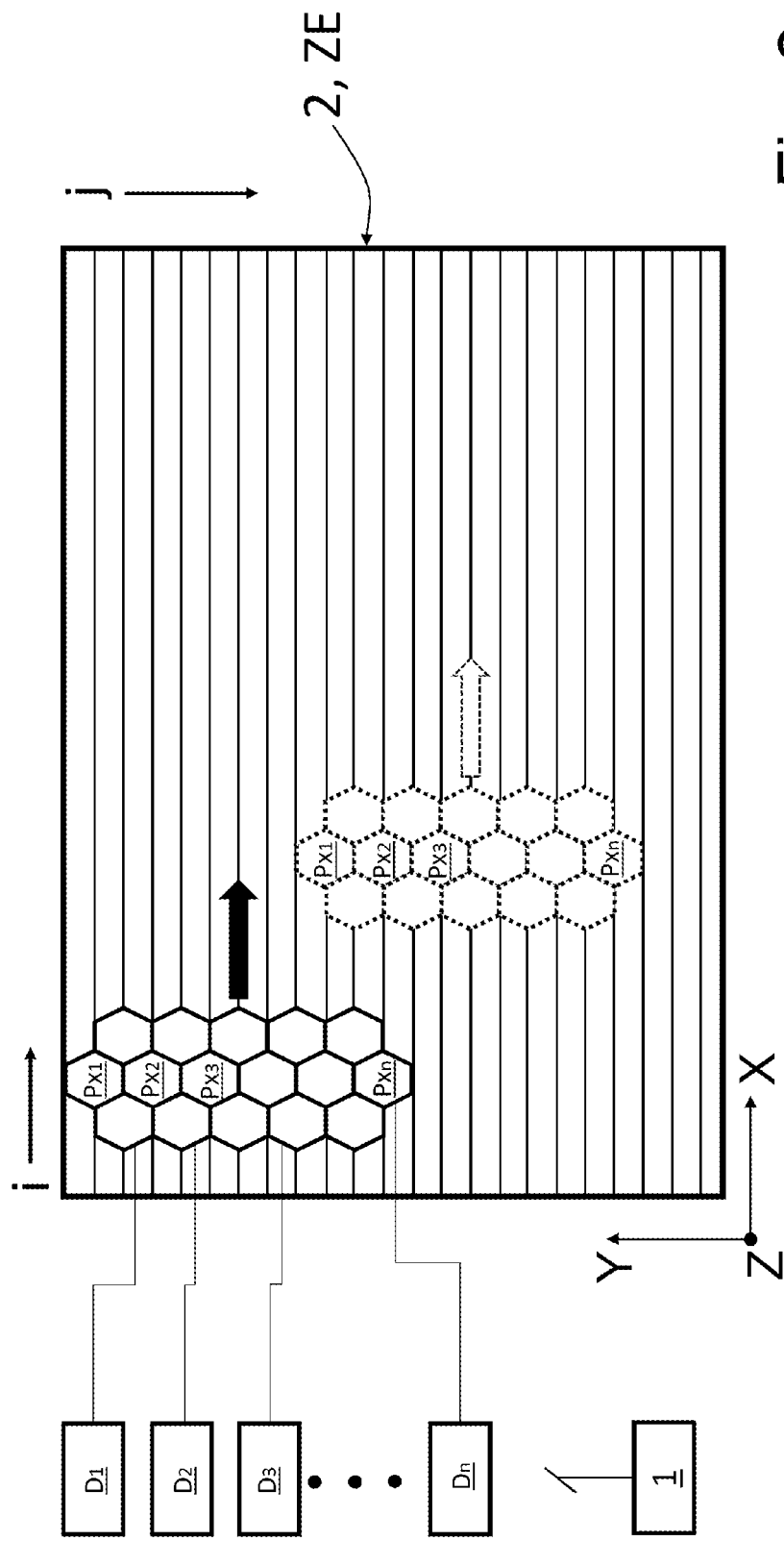
FIG. 2 shows a schematic representation of a unidirectional scanning scheme for an object plane.

FIG. 2 shows an embodiment of the method in which the rows j are always scanned along one direction, the direction of the forward scan in this case. In this configuration, too, the pixels Pxn (illustrated using dashed lines) are displaced orthogonally to the direction of the rows j by the parallelization factor P for subsequent scanning.

The intensity values of the reconstructed image serve as a basis for the subsequent reduction of image artifacts within the meaning of this invention.

Thus, row sums of the intensity values of the reconstructed image are formed. A mean value is formed from the row sums of all rows j which were captured by a pixel $Px_n$, for example the pixel $Px_1$. This procedure can be illustrated as follows:

$$\hat{S}(j_{parallel}) = \sum_{i=i_{max}}^{1} \sum_{j=j_{max}/P}^{1} S_{rekonstruiert}(i, j_{parallel} + j \cdot P) \Bigg|_{j_{parallel} = P-1}^{0}$$

where:
- $\hat{S}(j_{parallel})$—row sum of a pixel $Px_n$;
- $S_{rekonstruiert}$ the signal of the reconstructed image data of a pixel $Px_n$ of an object plane 2;
- i—index of the column of the reconstructed image;
- j—index of the row of the reconstructed image;
- $j_{parallel}$—row vector of the rows that are respectively captured by a certain pixel $Px_n$ ([1 ... P]);
- P—parallelization factor of the scan: spacing of rows j, by which a pixel $Px_n$ is offset perpendicular to the row direction between two scans, for example forward scan and return scan.

A correction value for those j rows that were swept over and captured by a certain pixel $Px_n$, for example the first pixel $Px_1$, is ascertained by virtue of the mean values of the parallelized rows being normalized and an inverse of the form:

Being formed, where
$\hat{S}_{norm}(j_{parallel})$—correction values respectively for those rows j that were captured by a certain pixel $Px_n$.

The reconstructed image data of the rows j respectively captured by this pixel $Px_n$ are multiplied by the correction values, obtained thus, for each pixel $Px_n$:

$$S_{korr}(i, j) = S_{rekonstruiert}(i, j_{parallel} + j \cdot P) \cdot \hat{S}_{norm}(j_{parallel}) \Bigg|_{i=i_{max}}^{1} \Bigg|_{j=j_{max}/P}^{1} \Bigg|_{j_{parallel} = P-1}^{0}$$

where:
- $S_{korr}(i,j)$—a signal (image data) of a corrected image of an object plane 2 or a Z-plane ZE.

Such a reduction of image artifacts in an object plane 2 or in a Z-plane ZE serves as a base correction.

In a more developed configuration of the method according to the invention, an extended correction can be undertaken.

If image data of a plurality of object planes 2 that lie successively in the direction of the Z-axis (Z-direction) are captured, the image data thereof can also be corrected by means of the method according to the invention and image artifacts, in particular stripe formation, can be reduced.

Figure 3:
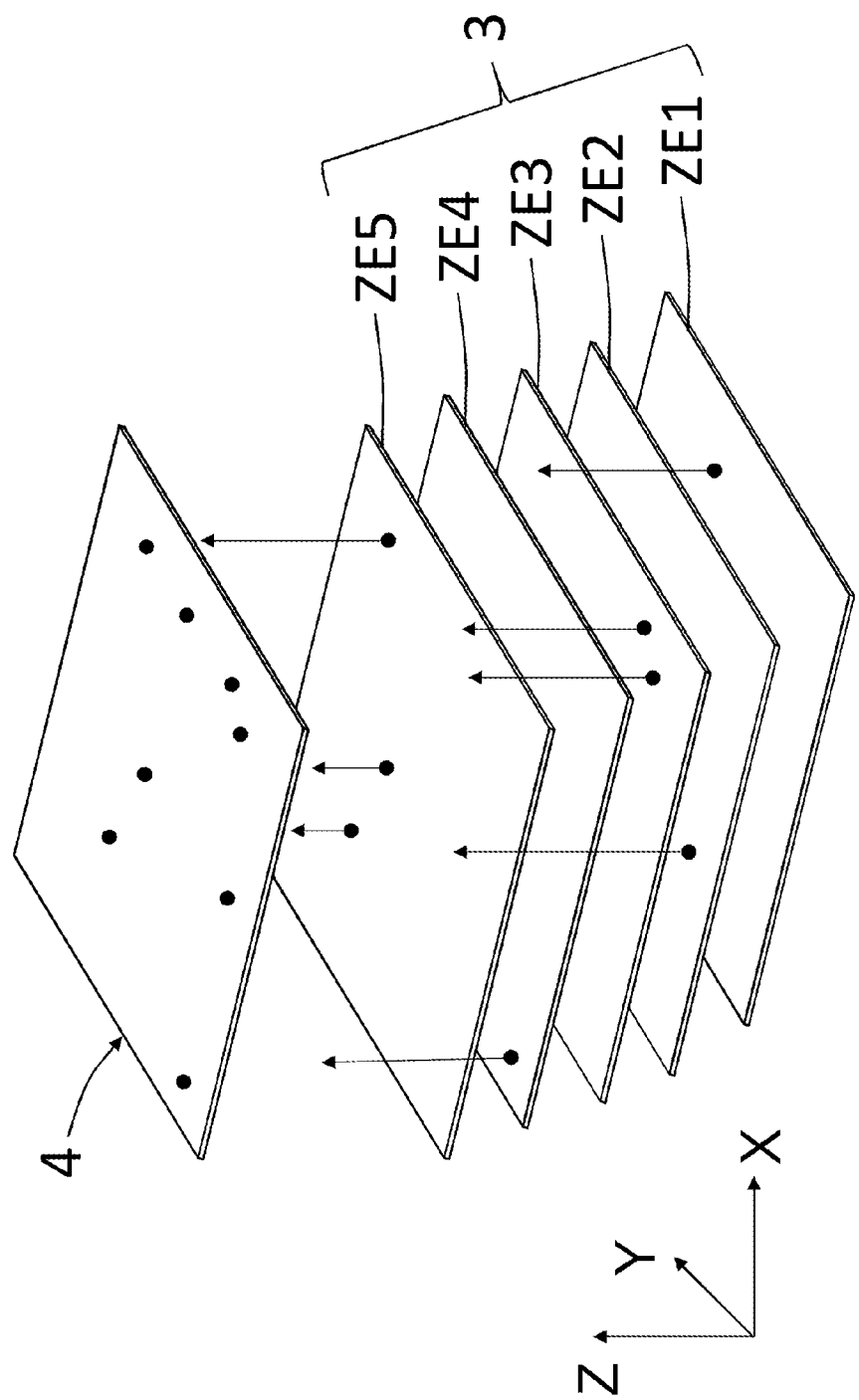
FIG. 3 shows a schematic representation of a Z-stack.

For explanatory purposes, FIG. 3 presents a Z-stack 3 with a number of Z-planes ZE. Shown in exemplary fashion are k=5 Z-planes ZE1 to ZE5, which are slightly displaced against one another for a better illustration. The individual Z-planes ZE1 to ZE5 are already stripe-reduced corrected images according to the above-described base correction in each case. Each of the Z-planes ZE1 to ZE5 contains elevated intensity values, of which only a few are shown in exemplary fashion as filled circles.

The Z-planes ZE1 to ZE5 are subjected to a maximum intensity projection (MIP), as a result of which a two-dimensional image representation of all Z-planes ZE1 to ZE5 is obtained as an MIP image 4. Here, the highest intensities along the Z-direction are projected into the plane of the MIP image 4. Thus, the MIP image 4 unifies the projections (symbolized by arrows) of the points with the highest intensities of all Z-planes ZE1 to ZE5. The MIP is implemented in the direction of the Z-axis, and so the points of the MIP image 4 no longer contain information about the Z-planes ZE1 to ZE5 from which they originate; however, the two-dimensional positioning thereof along the X-axis X and the Y-axis Y—and hence also the position thereof in respect of the row j and column i—is maintained in the MIP image 4.

The MIP can be represented as follows:

$$\check{S}(i, j) = \max_{1 \leq k \leq k_{max}} S_{rekonstruiert}(i, j, k) \Bigg|_{i=i_{max}}^{1} \Bigg|_{j=j_{max}}^{1}$$

where
$\check{S}(i,j)$—MIP in an XY-plane of maximum values in the intensity values of the Z-planes ZE1 to ZE5 for all pixels $Px_n$.

In accordance with the procedure in the base correction, a reduction of image artifacts is undertaken on the basis of the MIP, more precisely: on the basis of the MIP image 4 produced. Here, the MIP image 4 produced as described above serves as sample to be imaged or as (only) object plane 2.

Row sums are formed again on the basis of the MIP image 4, wherein the relevant rows j were swept over and captured by a certain pixel $Px_n$ in each case during the capture of the image data of the Z-stack 3.

This step can be expressed by $$\hat{S}(j_{parallel}) = \sum_{i=i_{max}}^{1} \sum_{j=j_{max}/P}^{1} \tilde{S}(i, j_{parallel} + j \cdot P) \Big|_{j_{parallel} = P-1}^{0}$$

Accordingly, the mean values are formed and normalized $$\hat{S}(j_{parallel}) = \sum_{i=i_{max}}^{1} \sum_{j=j_{max}/P}^{1} \tilde{S}(i, j_{parallel} + j \cdot P) \Big|_{j_{parallel} = P-1}^{0}$$

and the correction value (MIP correction value) specific to each pixel $Px_n$ is ascertained with the formation of the inverse:

The correction values specific to each pixel $Px_n$ ascertained thus are multiplied by the image data of the corresponding rows j, k of the individual Z-planes ZE1 to ZE5 and images of the Z-planes ZE1 to ZE5 corrected thus are obtained:

$$S_{korr\_3D}(i, j) = S_{rekonstruiert}(i, j_{parallel} + j \cdot P, k) \cdot \hat{S}_{norm}(j_{parallel}) \Big|_{i=i_{max}}^{1} \Big|_{j=j_{max}/P}^{1} \Big|_{j_{parallel}=P-1}^{0} \Big|_{k=k_{max}}^{1}$$

where $S_{korr\_3D}$—corrected image data of a Z-plane ZE on the basis of the maximum intensity projection (MIP); and k—an index of the reconstructed image in the Z-direction (=index of the Z-plane ZE).

Figure 4:
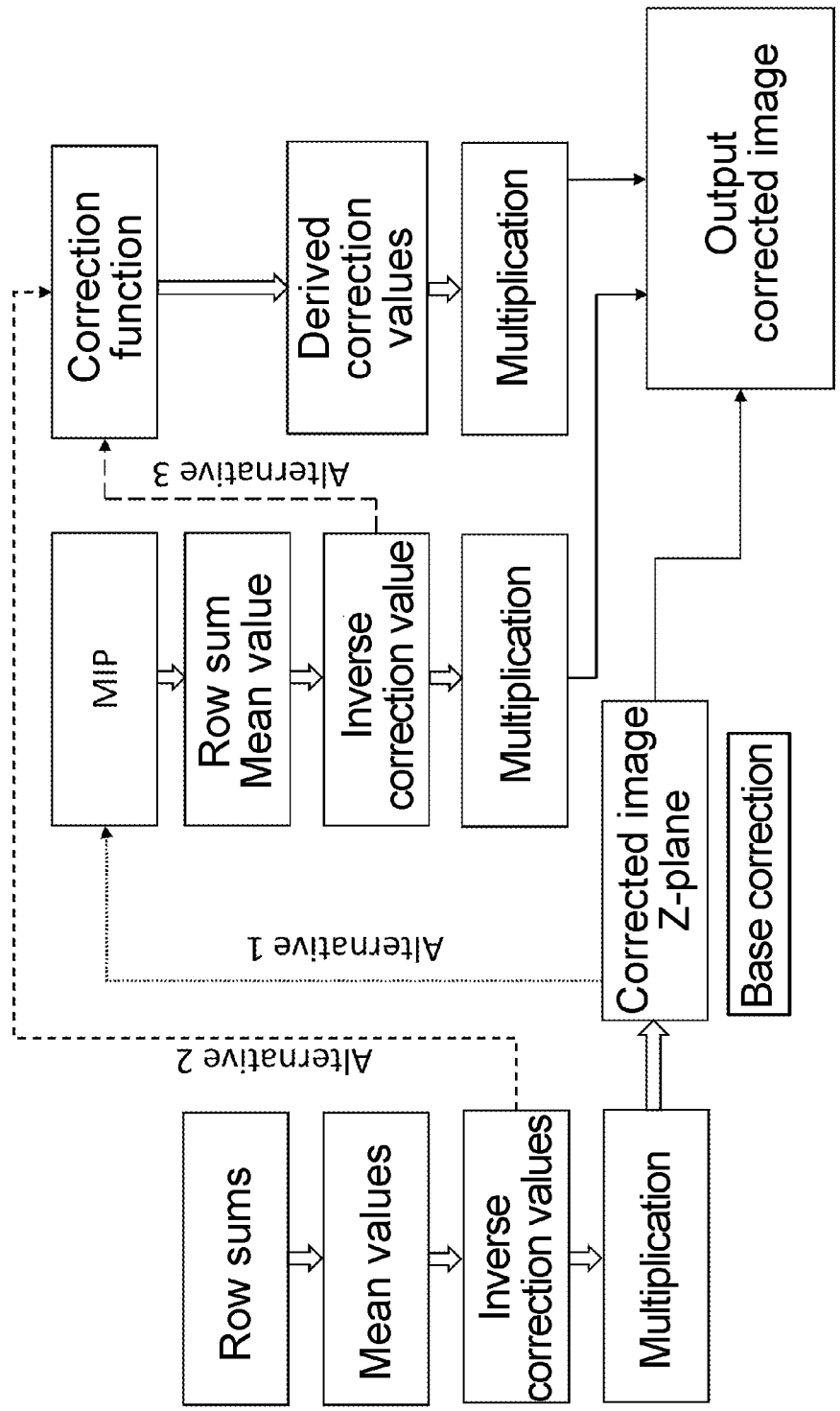
FIG. 4 shows a schematic representation of a flowchart of the method according to the invention with two alternative configurations.

The procedure of the method according to the invention, with its configurations as a base correction or with an additional extended correction under the application for maximum intensity projection MIP, is schematically reproduced in FIG. 4.

Following the row-by-row capture of image data by means of certain pixels $Px_n$ and detectors Dn in each case, row sums of the intensity values of each row j are formed on the basis of a reconstructed image, said row sums having been captured by one of the pixels $Px_n$. This is followed, in further steps, by the formation of a mean value, in particular a normalized mean value, and its inverse. A corrected image is obtained by multiplying the image data of the reconstructed image by the correction value. The base correction is completed with the method step specified last and the corrected image can be displayed on a monitor or output, for example.

If there should be an extended correction for a number of Z-planes ZE, an MIP is carried out (Alternative 1), on the basis of the corrected images of said planes, in the direction of the Z-axis Z and an MIP image 4 is produced (see FIG. 3). Row sums are formed, again, on the basis of the MIP image 4 and the normalized mean values and inverses thereof are used for ascertaining a correction value for each pixel Pxn. The image data of the individual corrected images are multiplied by the correction values in accordance with their assignment to certain pixels Pxn and corrected image data of the individual Z-planes ZE, and hence of the Z-stack 3, are obtained:

In an alternative to the procedure via the production of an MIP image 4, the correction values can be combined by calculation, for example multiplied, with a correction function (Alternative 2). Then, the derived correction values are multiplied by the corresponding image data and a corrected image is obtained.

In a further configuration, the correction function can also be applied to the correction values ascertained by means of the MIP image 4 (Alternative 3).

The invention claimed is:

1. A method for reducing image artifacts in an image of a sample captured by scanning, the method comprising:
   capturing intensity values of at least two detection regions, denoted as pixels (Pxn), along respectively first rows (j) in a first scanning direction, the detection regions being located in an object plane of one or more detectors configured to capture the intensity values, and the first rows being in the object plane;
   producing a reconstructed image of the sample based on the captured intensity values;
   summing the intensity values of the reconstructed image along the first rows (j) respectively scanned by a certain pixel ($Px_n$) and to form a row sum in each case,
   ascertaining a correction value of the pixel ($Px_n$) on the basis of the row sums formed thus; and
   applying the correction value to the intensity values, captured by means of the pixel ($Px_n$), of the reconstructed image, to obtain a corrected image.

2. The method according to claim 1, further comprising: capturing intensity values of respective further rows (j) following the capture of the first rows (j), the further rows (j) being in the object plane, and displaced by a number P of rows (j) from the first rows, corresponding to a parallelization factor (P), in a second direction substantially orthogonal to the first scanning direction.

3. The method according to claim 1 wherein the correction value is formed as a mean value of all row sums of the first rows (j) scanned by means of a pixel ($Px_n$).

4. The method according to claim 3, further comprising multiplying reconstructed image data of the first rows scanned by means of the pixel by an inverse of the correction value as a correction factor.

5. The method according to claim 1, further comprising storing the correction value for use in a subsequent production of a number of corrected images.

6. The method according to claim 1, wherein a maximum intensity projection is applied to at least two corrected images of Z-planes (ZE1 to ZE5) that lie in succession in a Z-direction and, on the basis of an MIP image obtained thus, the summing the intensity values to for the row sums and the ascertaining the correction value are carried out again to ascertain second correction values and the ascertained second correction values are applied to image data of the corrected images of the Z-planes (ZE1 to ZE5).

7. The method according to claim 4, wherein a maximum intensity projection is applied to at least two corrected images, image data of which were captured either at different times or with at least two different channels or the image data of which were captured at different locations on the sample and/or at different recording angles, and, on the basis of an MIP image obtained thus, the summing the intensity values, the ascertaining the correction value and ascertaining the inverse are carried out again and the ascertained correction values or their inverses are applied to the image data of the corrected images.

8. The method according to claim 1, wherein a value range of the correction values is limited by virtue of admissible maximum values and/or admissible minimum values being specified or by virtue of the correction values being limited by a restricting function.

9. The method according to claim 8, wherein the admissible maximum values and/or admissible minimum values or the restricting function are fitted on the basis of a simulation calculation.

10. The method according to claim 1, wherein derived correction values are formed by means of a correction function, with use being made of the ascertained correction values.

11. The method according to claim 4, further comprising storing the inverse the correction value for use in the subsequent production of a number of corrected images.

12. The method according to claim 4, wherein a maximum intensity projection is applied to at least two corrected images of Z-planes (ZE1 to ZE5) that lie in succession in a Z-direction and, on the basis of an MIP image obtained thus, the summing the intensity values, the ascertaining the correction value and ascertaining the inverse the correction value are carried out again and the ascertained correction values or their inverses are applied to the image data of the corrected images of the Z-planes (ZE1 to ZE5).

* * * * *